June 11, 1929.  S. GREENHOUSE  1,716,850
VALVE
Filed July 29, 1925  2 Sheets-Sheet 2
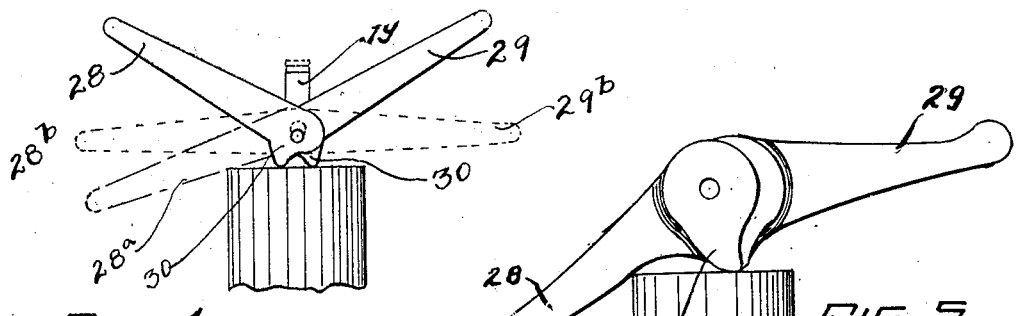
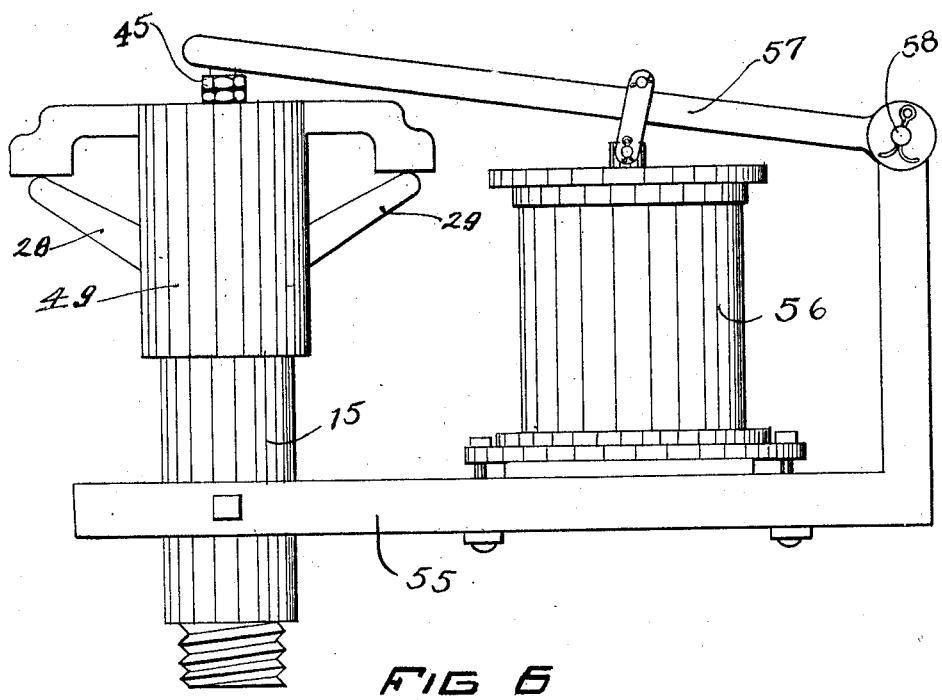
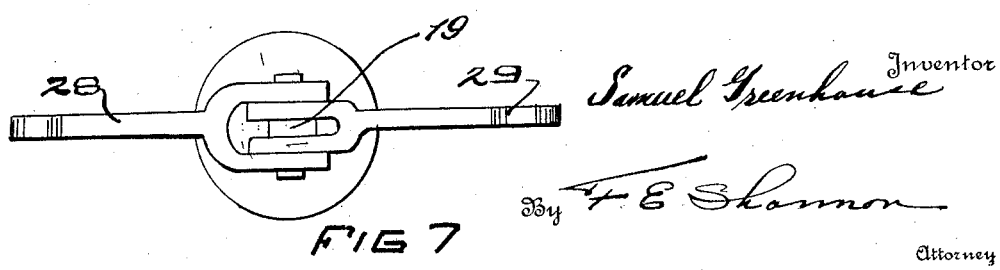
Samuel Greenhouse, Inventor
By F. E. Shannon
Attorney Patented June 11, 1929.

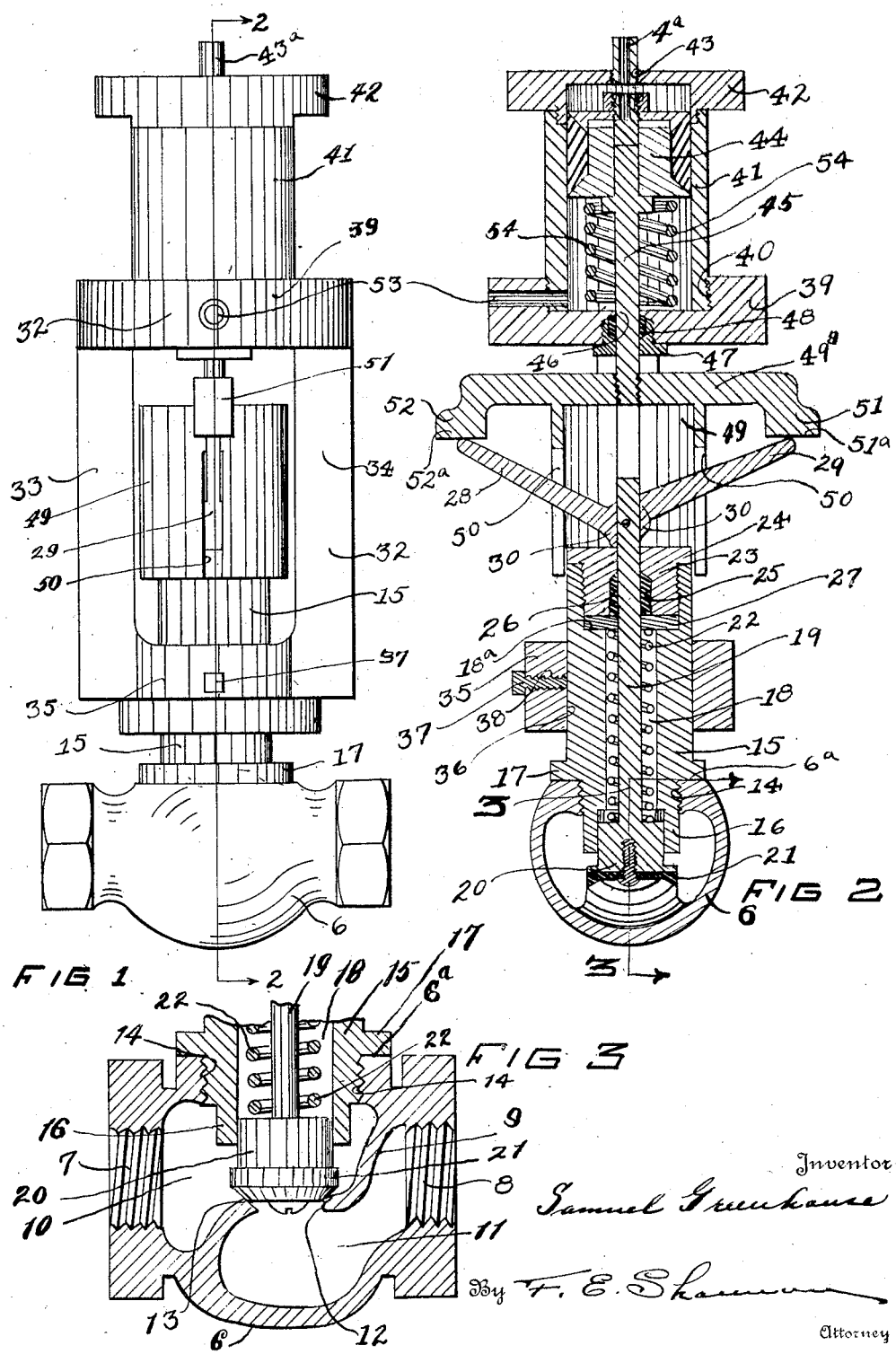

1,716,850

UNITED STATES PATENT OFFICE.

SAMUEL GREENHOUSE, OF AKRON, OHIO.

VALVE.

Application filed July 29, 1925. Serial No. 46,790.

This invention relates to valves and has particular relation to new and useful improvements in automatically operable valves. While the invention may be applied to valves generally, it is particularly adapted for use in controlling the flow of fluid to a bottling machine, and, the particular adaptation of the invention herein illustrated and described is for use as shown in my pending application for United States Letters Patent, Serial Number 732,994.

Objects of the invention are to provide an automatically operable valve which in use may be operated by the same force which controls the operation of the bottling machine, whereby the valve will be automatically opened when the bottling machine is put in operation and will be automatically closed when the operation of the bottling machine is stopped.

A further object is to provide a normally closed valve which will hold fluid under heavy pressure without leakage and which may be operated with a minimum amount of power.

Other objects are to provide a valve of simple, durable construction, which may be manufactured at a low cost, which will not easily get out of repair and which in use will be accurate and reliable.

An additional object is to provide a valve comprising a new and novel arrangement of parts whereby the same may be operated by the force used in controlling the operation of the bottling machine or other device in connection with which the valve is adapted to be used and which may be easily and conveniently operated independently of such force.

The above objects are accomplished and additional ends are attained by the novel construction, combination, and arrangement of parts hereinafter described and illustrated in the accompanying drawing in which I have shown a preferred form of the invention, it being understood that the invention may be adapted in various ways for various purposes and that changes and modifications may be made or resort had to substitutions which come within the spirit of the invention as set forth in the appended claims.

In the drawings like characters of reference are employed to designate like parts as the same may appear in any of the several views and in which:—

Figure 1 is a side elevational view of a valve constructed in accordance with this invention, Figure 2 is a vertical, sectional view of the same taken as indicated by the lines 2—2 of Figure 1.

Figure 3 is a central, vertical, sectional view of the lower portion of said valve taken as indicated by the line 3—3 of Figure 2.

Figure 4 is a fragmentary view showing a portion of my improved valve and illustrating in side elevation the action of the levers employed in raising and lowering the valve stem.

Figure 5 is a similar view showing the manner in which one of the levers may be operated to hold the valve in an open position.

Figure 6 is a view illustrating a modification of the invention in which a solenoid is employed to operate the valve mechanism, the same being adapted for use where electricity is used to operate or control the bottling machine.

Figure 7 is a plan view illustrating the manner by which the levers are secured to the valve stem.

Proceeding now to a detailed description of the invention with reference to the particular adaptation thereof disclosed in the drawings, the numeral 6 is used to denote the valve casing which is in the form of a T-coupling member. The casing 6 is provided with an inlet opening 7 and an outlet opening 8 which is in coaxial alinement with the inlet opening 7. The walls of each of said openings 7 are internally threaded to receive the externally threaded ends of a conduit. The casing 6 is hollow and is provided with the partition 9 which is positioned thereacross as shown in Figure 3 to provide an inlet chamber 10 and an outlet chamber 11. The partition 9 is provided with an aperture 12 and a valve seat 13 is arranged therearound. The numeral 14 denotes an opening which extends into the upper wall of said casing in axial alinement with the opening 12. The walls of the opening 14 are internally threaded to receive the externally threaded end of the member 15. The member 15 is provided at the lower end thereof with an externally threaded reduced portion 16 which is operatively positioned in the threaded bore 14. The member 15 is preferably cylindrical and is provided at a point in spaced relation to the lower end thereof with an outwardly projecting annular flange 17 which is arranged to bear against the upper face 6ª of the casing 6 and form a fluid tight connection therebetween. The member 15 is provided with an axially arranged bore 18 in which is slidably mounted a valve stem 19. The valve stem 19 is provided at the lower end thereof with a valve head 20 which is arranged to be operatively positioned on the seat 13 to close the opening 12. The valve head 20 may be provided with a suitable packing 21. The numeral 22 denotes a coil spring which is mounted on the rod 19 so as to bear against the valve head 20. The bore 18 is enlarged adjacent the upper end of the member 15 to provide the shoulder 18ª and the wall of said bore is internally threaded to receive the plug 23. The plug 23 is provided at the upper edge thereof with an annular flange 24 which is arranged to seat against the upper edge of the member 15. The plug 23 is provided with the packing gland 25 in which is fitted a suitable packing 26.

The numeral 27 denotes a washer which is arranged in the enlarged portion of the bore 18 so as to be positioned between the lower end of the plug 23 and the shoulder 18ª. The washer 27 is arranged to bear against the upper end of the coil spring 22 and hold the same in a compressed position whereby the head 20 is normally held in a closed position. The numerals 28 and 29 denote levers which are pivotally secured to the upper end of the valve stem 19. The levers 28 and 29 are coaxially fulcrumed on the stem 19 and each is provided with a cam head 30 which bears against the plug 23. The levers 28 and 29 extend outwardly in opposite directions and upwardly and are arranged so that a downward movement of the free ends thereof will cause an upward movement of the valve stem 19 as shown in Figure 4.

The numeral 32 denotes a frame comprising two parallel members 33 and 34, having an integrally formed connecting lower portion 35 which is in the form of a ring, the same being provided with a vertical bore 36. The lower portion 35 is positioned on the member 15 with the said member 15 received in the bore 36. A suitable set screw 37 is operatively positioned in a threaded bore 38 so that it may be operated against the member 15 to hold the frame securely in position thereon. The side members 33 and 34 are connected at the upper end thereof to a wall 39 which is preferably formed integrally therewith. The wall 39 is circular and is provided on the upper end thereof with the threaded cylindrical cavity 40. The numeral 41 denotes a hollow cylinder which is externally threaded at the lower end thereof and is operatively positioned in the cavity 40. The numeral 42 denotes a cap which is threaded on the upper end of the cylinder 41. The cap is provided on the upper wall thereof with a threaded bore 43 in which is threaded a suitable hollow plug 4ª, which may be used to attach a conduit thereto.

The numeral 44 denotes a piston which is operatively mounted in the cylinder 41. The numeral 45 denotes a piston rod which is operatively connected to said piston and which extends through a suitable bore 46 in the wall 39. The numeral 47 denotes a gland plug which is operatively threaded in the lower end of the wall 39 so as to compress the packing 48 and form a fluid tight joint around the piston rod 45. The numeral 49 denotes a cylindrical shell having a cavity adapted to receive the upper end of the member 15. The shell 49 is enclosed at the upper end thereof with the upper wall 49ª. The shell is positioned on the member 15 and is provided on diametrically opposite sides thereof with slots 50 which are adapted to receive the arms 28 and 29 so that the shell 49 may be moved freely on the member 15. The shell 49 is provided at the upper end thereof on diametrically opposite sides thereof with outwardly projecting arms 51 and 52. The arms 51 and 52 are provided at the outer ends thereof with downwardly projecting portions 51ª and 52ª. Said portions are arranged to bear against the outwardly projecting ends of the levers 29 and 28 whereby a downward movement of said shell will cause the arms 51 and 52 to engage the levers 29 and 28 and raise the valve stem 19 to lift the valve head 20 from its seat 13. The lower end of the piston rod 45 is suitably secured to the upper end of the shell 49 whereby a downward movement of the piston 44 will cause an upward movement of the valve stem 19. The cylinder 41 is provided at a point adjacent the lower end thereof with an opening 53 in which a pipe or other suitable conduit may be secured. The numeral 54 denotes a spring which is positioned in the cylinder 41 and is compressed between the piston head 44 and the wall 39 whereby the piston 44 and the shell 49 is normally held in an upward position.

The valve is operated by introducing fluid pressure through the entrance tube 4ª thus forcing the piston 44 downwardly in the cylinder 41 and causing the arms 51 and 52 to bear against the levers 29 and 28, thus raising the valve head 20 upwardly and permitting liquid under pressure to flow from the inlet chamber 10 through the opening 12 and through the outlet chamber 11. The piston stroke is such that the full downward movement of the piston 44 will move the levers 28 and 29 to the dotted line position 28ᵇ and 29ᵇ as shown in Figure 4. In this position a release of the fluid pressure on the upper part of the piston 44 will cause the piston to be moved upwardly by the spring 54. One of the levers 28 when operated to the position shown in Figure 5 so that the cam 30 will be operated past the center, will hold the valve in an open position. It will thus be seen that I have provided an automatically operable valve which may also be manually operated by a downward movement of the lever 28.

In actual use, on a bottling machine, the hollow plug 4ª is operatively connected to a tube leading to a source of air under pressure, such, for instance, a pneumatically operated clutch whereby the fluid used to operate the clutch will also open the valve and permit the liquid to flow to the bottling machine.

A conduit may also be connected in the opening 53 whereby fluid pressure may be used to move the piston upwardly in the cylinder 41 either with or without the action of the spring 54. The same pipe system may be used as shown and described in my pending application, Serial Number, 732,994. In using either air or electricity to control or operate the bottling machine, the valve 21 will automatically close as soon as the operation of the machine is stopped.

In Figure 6, I have shown a modification of the invention in which the rod 45 extends upwardly through the cap 42 and a suitable frame 55 is secured to the member 15. A solenoid 56 is mounted on said frame and is operatively connected to a lever 57 which is fulcrumed on the frame 55 as at 58. The free end of the lever being arranged to engage the upwardly projecting end of the rod 45. This adaption of the invention is preferably used in bottling machines and other devices where no compressed air or other fluid is used in the operation of the machine. In cases where the machine is electrically operated the solenoid 56 is operatively interposed in a circuit whereby the same source of power which starts the machine in operation will operate the solenoid and cause a downward movement of the rod 45, thus raising the valve head 20 and opening the valve which controls the flow of liquid to the machine.

Having thus illustrated my invention and described the same in detail, what I claim as new and desire to secure by Letters Patent is:—

1. In a device of the class described, a hollow valve body adapted to be operatively interposed in a conduit, a partition in said body, an opening in said partition, a valve operable to close said opening, a member secured to said body, the stem of said valve being axially arranged in said member and projecting therefrom, a pair of oppositely disposed levers coaxially fulcrumed on the outwardly projecting end of said stem, each of said levers provided on the inner end thereof with a cam face, operable against the said member to move said stem and operate said valve, a shell slidably mounted on said body, said shell provided with a pair of arms, each of which meets the outwardly projecting end of one of said levers, a frame secured to said body, an air cylinder mounted on said frame, a piston in said cylinder and a piston rod connected to said shell and means to introduce fluid pressure into said cylinder whereby the said arms may be moved downwardly against said levers to operate said valve.

2. In a device of the class described, a globe valve body provided with a slidable stem, a tubular extension on said body, said stem slidably mounted in said extension, means to normally hold said valve in a closed position, a pair of levers mounted on the stem so as to project therefrom in diametrically opposite directions, each of said levers provided on the inner end thereof with a cam face adapted to bear against said extension, whereby a downward movement thereof will raise said stem and open said valve; a hollow cylinder, a piston mounted therein, means to normally hold said piston in an upward position; a piston rod, a pair of arms associated therewith, said arms being positioned against said levers whereby a downward movement of said piston will operate said levers and open said valve.

3. In a device of the class described, a globe valve body provided with a slidable stem, a tubular extension on said body, said stem slidably mounted in said extension, means to normally hold said valve in a closed position, levers mounted on the stem so as to project therefrom in diametrically opposite directions, each of said levers adapted to bear against said extension, whereby a downward movement thereof will raise said stem and open said valve; a hollow cylinder, a piston mounted therein, means to introduce fluid pressure into said cylinder to operate said piston, a piston rod, a pair of arms associated therewith, said arms being positioned aganst said levers whereby a downward movement of said piston will operate said levers and open said valve.

4. In a device of the class described, a hollow valve body adapted to be operatively interposed in a conduit, a partition in said body, an opening in said partition, a valve operable to close said opening, a member secured to said body, the stem of said valve being slidably mounted in said member and projecting therefrom, a pair of oppositely disposed levers coaxially fulcrumed on the outwardly projecting end of said stem, each of said levers provided on the inner end thereof with a cam face operable against the said body to raise said stem and operate said valve; a member slidably mounted for movement longitudinally of said member, a pair of arms projecting from said member, each of said arms meeting the outwardly projecting end of one of said levers, and power operated means to move said member and operate said valve.

5. In a device of the class described, a hollow valve body adapted to be operatively interposed in a conduit, a member secured to said body, a valve stem, said stem being slidably mounted in said member, a lever fulcrumed on said stem, said lever provided on the inner end thereof with a cam face operable against the axial face of said body to raise said stem and operate said valve; a member slidably mounted for movement longitudinally of said member, an arm projecting from said member, said arm meeting the outwardly projecting end of said lever, a cylinder, a piston in said cylinder and a piston rod operatively connected to said piston, means to normally hold said piston in an upward position in said cylinder and means to introduce fluid pressure into said cylinder to move said piston and operate said valve.

6. In a device of the class described, a hollow valve body adapted to be operatively interposed in a conduit, a partition in said body, an opening in said partition, a valve operable to close said opening, a member secured to said body, the stem of said valve being slidably mounted in said member and projecting therefrom, a pair of oppositely disposed levers coaxially fulcrumed on the outwardly projecting end of said stem, each of said levers provided on the inner end thereof with a cam face operable against the axial face of said body to move said stem and operate said valve; a member slidably mounted for movement longitudinally of said stem, a pair of arms projecting from said member, each of said arms meeting the outwardly projecting end of one of said levers, a cylinder, a piston in said cylinder and a piston rod operatively connected to said piston, means to normally hold said piston in an upward position in said cylinder and means to introduce fluid pressure into said cylinder to move said piston and operate said valve.

In testimony whereof I have hereunto set my hand.

SAMUEL GREENHOUSE.